(12) United States Patent
Vyas et al.

(10) Patent No.: US 12,441,694 B2
(45) Date of Patent: Oct. 14, 2025

(54) PROCESS FOR THE PREPARATION OF METHYLENE BLUE

(71) Applicant: DISHMAN CARBOGEN AMCIS LTD., Ahmedabad (IN)

(72) Inventors: Janmejay Rajnikant Vyas, Ahmedabad (IN); Himani Dhotre, Ahmedabad (IN); Denish H. Shah, Ahmedabad (IN); Krunal Parikh, Ahmedabad (IN)

(73) Assignee: DISHMAN CARBOGEN AMCIS LTD., Ahmedabad (IN)

( * ) Notice: Subject to any disclaimer, the term of this patent is extended or adjusted under 35 U.S.C. 154(b) by 596 days.

(21) Appl. No.: 17/802,565

(22) PCT Filed: Feb. 27, 2021

(86) PCT No.: PCT/IB2021/051604
§ 371 (c)(1),
(2) Date: Aug. 26, 2022

(87) PCT Pub. No.: WO2021/171235
PCT Pub. Date: Sep. 2, 2021

(65) Prior Publication Data
US 2023/0138553 A1    May 4, 2023

(30) Foreign Application Priority Data
Feb. 28, 2020  (IN) .............................. 202021008602

(51) Int. Cl.
*C07D 279/18*  (2006.01)

(52) U.S. Cl.
CPC .................. *C07D 279/18* (2013.01)

(58) Field of Classification Search
CPC .................................................. C07D 279/18
See application file for complete search history.

(56) References Cited

U.S. PATENT DOCUMENTS

| | | | |
|---|---|---|---|
| 10,537,578 B2 | 1/2020 | Storey et al. | |
| 11,059,797 B2 | 7/2021 | Benadikova et al. | |
| 2009/0291943 A1 | 11/2009 | Feraud et al. | |
| 2020/0010436 A1 | 1/2020 | Benadikova et al. | |
| 2020/0010438 A1 | 1/2020 | Feraud et al. | |

FOREIGN PATENT DOCUMENTS

| | | |
|---|---|---|
| CA | 2579169 A1 | 3/2006 |
| EP | 3375777 A1 | 9/2018 |

OTHER PUBLICATIONS

Search Report & Written Opinion dated May 28, 2021, Application No. PCT/IB2021/051604.

*Primary Examiner* — Paul V Ward
(74) *Attorney, Agent, or Firm* — The Dobrusin Law Firm, P.C.; Alexandria J. Janda

(57) ABSTRACT

Provided herein is a process for preparation of 3,7-bis-(dimethy-lamino)-phenothiazin-5-ium chloride: Formula (I). The said process comprises preparing 3,7-dibromophenothiazin-5-iumbromide wet Crude(III) from phenothiazine (II) alongpro-moter, catalyst and brominating agent in presence of organic solvent; preparing 3,7-bis-(dimethylamino)-phenothiazin-5-ium bromide (IV) from 3,7-dibromophenothiazin-5-ium bromide; preparing 3,7-bis (Dimethylamino)-phenothiazin-5-ium chloride from 3,7-bis-(dimethylamino)-phenothiazin-5-ium bromide and subsequently purifying and removing metal content through metal scavenger from 3,7-bis-(dimethylamino)-phenothiazin-5-ium chloride (I). The present process eliminates the additional step of ion exchange column in the reaction and provides 99 to 99.5 percentage of product purity.

Formula I

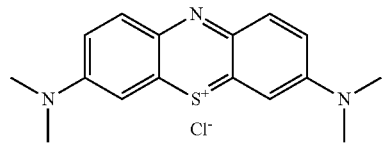

9 Claims, No Drawings

PROCESS FOR THE PREPARATION OF METHYLENE BLUE

FIELD OF INVENTION

The present invention relates to a process for preparation of 3,7-bis-(dimethylamino)-phenothiazin-5-ium chloride (I). More particularly, present invention relates to a process for preparation of 3,7-bis-(dimethylamino)-phenothiazin-5-ium chloride (I) with high purity of formula (I) reported below.

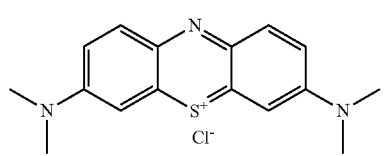

Formula I 3,7-bis(dimethylamino)phenothiazin-5-ium chloride

BACKGROUND OF THE INVENTION 3,7-bis-(dimethylamino)-phenothiazin-5-ium chloride (also known as methylthioninium chloride, Methylene Blue and MTC) is a well known phenothiazine dye for hair, leather and cellulosic fibres, a redox indicator, a photosensitizer for singlet oxygen generation, an antioxidant and an antiseptic stain for fixed and living tissue, diagnostic agent in renal function tests. Said Methythioniniurn Chloride (MTC) (also known as Methylene Blue) has a low molecular weight (319.86), is water soluble and a tricyclic organic compound.

Methylene blue has many uses in different fields, such as biology and chemistry. At room temperature, it appears as a solid, odourless, dark green powder, that yields a blue solution when dissolved in water. Methylene blue should not be confused with methyl blue, another histology stain, new methylene blue, nor with methyl violet often used as pH indicator.

Methylene blue is a component of a frequently prescribed urinary analgesic/anti-infective/anti-spasmodic known as "Prosed", a combination of drugs which also contains phenyl salicylate, benzoic acid, hyoscyamine sulfate, and methenamine (aka hexamethylenetetramine and not to be confused with 'methanamine').

Methylene Blue, a well-known phenothiazine dye and redox indicator, has also been used as an optical probe of biophysical systems, as an intercalator in nanoporous materials, as a redox mediator. See, for example, Colour Index (Vol. 4, 3rd edition, 1971) and Lillie et al., 1979, and references cited therein. Methylene Blue is currently used to treat methemoglobinemia (a condition that occurs when the blood cannot deliver oxygen where it is needed in the body).

Methylene Blue is also used as a medical dye (for example, to stain certain parts of the body before or during surgery); a diagnostic (for example, as an indicator dye to detect certain compounds present in urine); a mild urinary antiseptic; a stimulant to mucous surfaces; a treatment and preventative for kidney stones; and for the diagnosis and treatment of melanoma.

Methylene blue was first described in a German Patent in 1877 (Badische Anilin-und Soda-Fabrik, 1877) wherein methylene blue was synthesized by nitrosylation of dimethyl aniline, subsequent reduction to form N, N-dimethyl-1, 4-diaminobenzene, and subsequent oxidative coupling in the presence of hydrogen sulphide ($H_2S$) and iron(III) chloride ($FeCl_3$). Thus, the patent uses more of metal ions which thereby increases the metal content in the product.

Prior Art and its Disadvantages

The Canadian patent application number CA2579169C relates to the field of chemical synthesis and purification, and more specifically to methods of synthesizing and purifying certain 3,7 diamino-phenothiazin-5-ium compounds including Methythioninium Chloride (MTC) (also known as Methylene Blue). Its method comprises the steps of, nitrosylation; nitrosyl reduction thiosulfonic acid formation; oxidative coupling; Cr(VI) reduction; isolation and purification of zwitterionic intermediate; ring closure; chloride salt formation; one of sulphide treatment; dimethyldithiocarbamate treatment; carbonate treatment; ethylenediaminetetraacetic acid treatment (EDTAT); organic extraction; and recrystallisation. The invention also pertains to the resulting compounds, compositions comprising them (e.g., tablets, capsules), and their use in methods of inactivating pathogens, methods of medical treatment and diagnosis, etc., for example, tauopathies, Alzheimer's disease (AD), skin cancer, melanoma, viral diseases, bacterial diseases, or protozoal diseases. Wherein, the present invention provides an improved process for preparation of Methylene Blue with high purity and reduced metal content in the final formula I. The above patent application fails to provide improved process with high purity. Moreover, it also fails to reduce the metal content in the 3,7 diamino-phenothiazin-5-ium compounds.

The European patent application number EP3375777A1 relates to a process for preparing 3,7-bis-(dimethylamino)-phenothiazin-5-ium bromide or chloride; a method of converting 3,7-bis-(dimethylamino)-phenothiazin-5-ium bromide to 3,7-bis-(dimethylamino)-phenothiazin-5-ium chloride; and the purification of 3,7-bis-(dimethylamino)-phenothiazin-5-ium chloride by crystallization from aqueous solution of hydrochloric acid, leading to a pharmaceutically acceptable 3,7-bis-(dimethylamino)-phenothiazin-5-ium chloride (methylthioninium chloride, methylene blue, MTC) of formula I below reported.

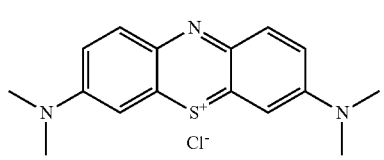

Formula I 3,7-bis(Dimethylamino)9phenothiazin-5-ium chloride

However, said above patent application discloses a process for preparing 3,7-bis-(dimethylamino)-phenothiazin-5-ium bromide or chloride with phenothiazine in the presence of metal catalyst. The above patent application provides additional step of ion exchange column for purification thereby increasing the process step which leads to increased cost of the process and make it cumbersome. Whereas, the present invention provides an improved process for the preparation of methylene blue which eliminates the additional step of ion exchange column thereby reduces the cost of the process. Therefore, the above application fails to provide the improved process for the preparation of methylene blue with high purity.

The US patent application number US20090291943A1 relates to a process for the preparation of diaminophenothiazinium type compounds comprising a step for purification of derivatives. Whereas the present invention provides an improved process for preparation of Methylene Blue with high purity and high yield with the reduction of metal content in the final formula I. The patent application also fails to reduce the metal content present in methylene blue. Whereas, the present invention provides reduction in metal content in methylene blue.

The US patent application number US20200010438A1 relates to a method for preparing 3,7-bis (dimethylamino) phenothiazin-5-ylium iodide, which uses phenothiazine as a starting material and includes the following steps: a) treating phenothiazine with diiodine, b) treating the reaction medium directly obtained from step a) with dimethylamine. However, said patent application discloses a different process by using different reagents. The above patent application also fails to reduce the metal content in methylene blue. Therefore, the above application fails to provide an improved process for the preparation of methylene blue with high purity.

Therefore, there is unmet need of improved process for preparation of methylene blue with high yield and high purity.

Disadvantages of the Prior Arts

The conventional process of methylene blue includes many disadvantages which are enlisted below:
1. The conventional process fails to provide an improved process for the preparation of methylene blue with high purity.
2. Most of them have high percentage of metal in methylene blue.
3. Many of them use additional step of ion exchange column for the preparation of methylene blue.
4. Most of the existing prior art processes provide higher percentage of impurities in the methylene blue, which reduce the efficiency and increase the cost of the product.

Objective of the Invention

The main objective of the present invention is to provide a process for the preparation of methylene blue with high percentage of purity.

Another objective of the present invention is to provide a process for the preparation of methylene blue achieving pharmaceutical grades.

Yet another objective of the present invention is to provide a process for the preparation of methylene blue with less percentage of metal content in the process.

Yet another objective of the present invention is to provide a process for the preparation of methylene blue which eliminates the additional step of ion exchange column in the reaction.

Yet another objective of the present invention is to provide a process for the preparation of methylene blue which reduces the percentage of organic and inorganic impurities thereby increases efficiency and reduces the cost of the process.

SUMMARY OF THE INVENTION

The process for preparation of 3,7-bis(dimethylamino)-phenothiazin-5-ium chloride (I); wherein said process comprises the steps of;

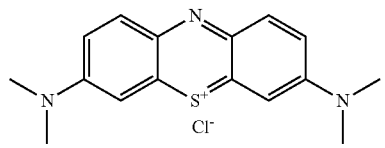

Formula (I)

(a) preparing 3,7-dibromophenothiazin-5-ium bromide (III) from phenothiazine (II) along promoter, catalyst and brominating agent in presence of an organic solvent;
(b) preparing 3,7-bis-(dimethylamino)-phenothiazin-5-ium bromide (IV) from 3,7-dibromophenothiazin-5-ium bromide;
(c) preparing 3,7-bis-(dimethylamino)-phenothiazin-5-ium chloride from 3,7-bis-(dimethylamino)-phenothiazin-5-ium bromide; and
(d) purifying the product and removing the metal content through metal scavenger from 3,7-bis-(dimethylamino)-phenothiazin-5-ium chloride (I).

DETAILED DESCRIPTION OF THE INVENTION

The present invention provides a process for the preparation of methylene blue with high purity. The present process of preparing methylene blue eliminates the additional step of ion exchange column in the reaction. The invention reduces the percentage of organic and inorganic impurities thereby increases efficiency and reduces the cost of the process.

The process of methylene blue consists of phenothiazine (II) which reacts with a promotor, p-toluene sulfonic acid (PTSA).

Scheme 1

Formula II

Formula III

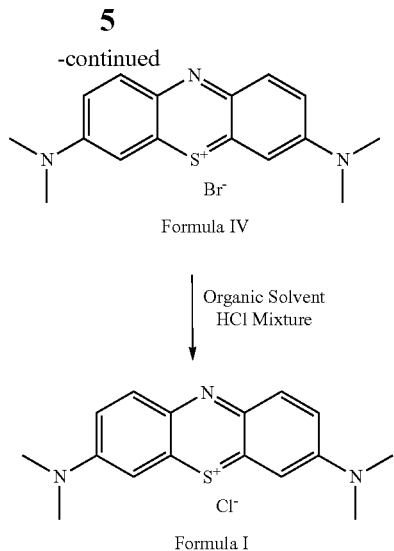

Formula IV

↓ Organic Solvent HCl Mixture

Formula I

The catalysts are selected as but not limited to metal catalyst and boron trifluoride acetic acid complexes. Wherein, the boron trifluoride acetic acid complexes with water such as boron trifluoride hydrate ($BF_3 \cdot H_2O$). The complexes of boron trifluoride acetic acid with alcohols, ethers, carboxylic acid esters, and nitriles are selected but not limited to boron fluoride ethyl acetate complex ($C_4H_8O_2 \cdot BF_3$), boron fluoride methyl benzoate complex, boron fluoride methanol complexes ($BF_3$—$CH_3OH$), boron fluoride ethanol complex ($BF \cdot C_2H_5OH$), boron fluoride glycol complex $BF_3$—$(CH_3OH)_2$, boron trifluoride etherate ($C_4H_{10}BF_3O$), boron trifluoride methyl amyl ether complex $BF_3 \cdot C_6H_{14}O$, boron trifluoride anisole complex $BF_3 \cdot C_6H_5OCH_3$, boron trifluoride tetrahydrofuran complex $BF_3$—$C_4H_8O$, boron trifluoride dioxan complex $BF_3$—$C_4H_8O_2$, boron trifluoride acetonitrile complex $BF_3$—$CHCN$, boron trifluoride benzonitrile complex $BF_3 \cdot CH_5CN$, boron trifluoride complexes with o-, m- and p-toluonitrile. Said metal catalyst is selected from, but not limited to the group VIII metals of the Periodic Table, for example, iron, cobalt, nickel. In other embodiments, said metal catalyst is selected but not limited to in the group IB metals of the Periodic Table, for example, copper and/or silver. In other embodiments, said metal catalyst is selected in the group IIIB & IIIA metals of the Periodic Table.

The bromination compounds are selected from but not limited to 1,3-dibromo-5,5-dimethylhydantoin and bromine. The 3,7-bis-(dimethylamino)-phenothiazin-5-ium bromide (IV) is prepared by adding Diemethylamine (DMA) and organic solvents. The organic solvents are selected from polar solvents and non-polar solvents but not limited to the ethyl acetate, methanol, acetic acid isopropyl alcohol, aqueous hydrochloric acid, hydrochloride acid (HCl), chloroform and polar protic and aprotic solvents such as dichloromethane, methylacetate, butylacetate and mixture thereof.

The metal scavenger eliminates the metal impurities from the product. The metal scavenger are selected from but not limited to polymers resins materials, silica based micropores, silicycle triamine, Quadrasil MP, Aliquat 336, AMPA-functionalized silica gel ≥99%, bipyridine, polymer-bound 100-200 mesh, cysteine-functionalized silica gel, 3-(Diethylenetriamino)propyl-functionalized silica gel, DL-Dithiothreitol, polymer-bound, DMT-functionalized silica gel, DOTA-functionalized silica gel, ethylenediaminetriacetic acid acetamide, polymer-bound, 3-(Ethylenediamino)propyl-functionalized silica gel, 2-Mercaptoethylamine, polymer-bound, 3-Mercaptopropyl-functionalized silica gel, Mixture of metal scavengers on silica gel, N-Propyldiethanolamine-functionalized silica gel ≥99 percentage or QuadraPure® AEA, QuadraPure® AMPA macroporous, QuadraPure® BDZ, QuadraPure® BZA, QuadraPure® EDA, QuadraPure® IDA macroporous, QuadraPure® MPA, QuadraPure® TU macroporous, 3-(1-Thioureido) propyl, Triamine tetraacetate, silica-supported, Triaminetetraacetate, sodium salt-functionalized silica gel, Triaminetetraacetic acid-functionalized silica gel, Triamine tetracetate, sodium salt, silica-supported, N, N, N'-Trimethylethylenediamine, polymer-bound, Biotage® MP-TMT or ISOLUTE® Si-TMT or ISOLUTE® Si-Thiol or ISOLUTE® SCX-2 or ISOLUTE® Si-Trisamine or Phosphonics SPM32. Said metal scavengers reduce the metal content within the range of <1 ppm to 10 ppm in the methylene blue; wherein more preferably <1 ppm to 3 ppm.

In a preferred embodiment the present improved process for preparation of methylene blue, which comprising the steps of;

Step (a): Preparing 3,7-dibromophenothiazin-5-ium bromide i.e Formula (III) from phenothiazine (II)

Phenothiazine (II) is charged into round bottom flask under nitrogen gas atmosphere along with p-toluene sulfonic acid (PTSA), catalyst and brominating agent in presence of organic solvents, as shown in scheme 1. Wherein, the catalysts are selected from but not limited to metal catalyst and boron trifluoride acetic acid complex. The bromination compounds are selected from but not limited to 1,3-dibromo-5,5-dimethylhydantoin and bromine. The organic solvents are selected from but not limited to ethyl acetate, methanol, acetic acid and chloroform.

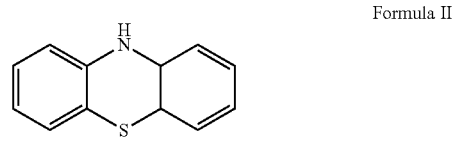 [SMILES: C1=CC2Nc3ccccc3SC2C=C1]

Formula II

The reaction is stirred at the temperature −20° C. to −30° C. to prepare 3,7-dibromophenothiazin-5-ium bromide (III).

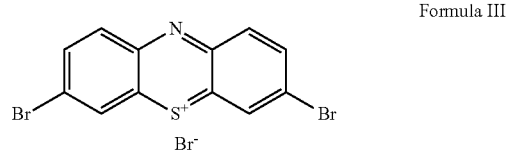 [SMILES: Brc1ccc2nc3ccc(Br)cc3[s+]c2c1 ; [Br-]]

Formula III

Step (b): Preparing 3,7-bis-(dimethylamino)-phenothiazin-5-ium bromide (IV)

To the product 3,7-dibromophenothiazin-5-ium bromide (III) which is obtained in above step (a), 40% of dimethylamine (DMA) solution is added in presence of organic solvent while stirring the reaction mass at −25° C. to −30° C. to give the product, 3,7-bis-(dimethylamino)-phenothiazin-5-ium bromide (IV).

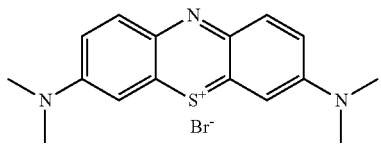

Step (c): Preparation 3,7-bis-(dimethylamino)-phenothiazin-5-ium chloride (I)

3,7-bis-(dimethylamino)-phenothiazin-5-ium bromide (IV) obtained in above step (b) is dissolved in organic solvent followed by the addition of 0.5M HCl solution. The reaction is refluxed for 2 to 3 hours at 40° C. to 80° C. temperature. The metal scavenger is added to the reaction mixture at 50° C. temperature and allowed to settle at 15° C.-20° C. temperature. The product is washed with cold organic solvent and dried to give the product 3,7-bis-(dimethylamino)-phenothiazin-5-ium chloride (I)

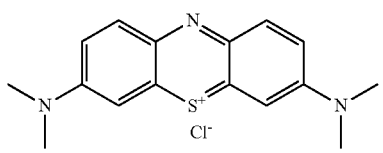

3,7-bis(dimethylamino)phenothiazin-5-ium chloride

The present invention provides a process for preparation of methylene blue which eliminates the additional step of ion exchange column in the reaction and provide 99 to 99.5 percentage of purity.

EXAMPLES

Example-1 (A)

Phenothiazine (II) (100 g) is charged into round bottom flask under Nitrogen gas atmosphere followed by the addition of ethyl acetate at room temperature. To this mixture Boron trifluoride acetic acid complex (19 g) was added. The temperature was brought to −20° C. PTSA·H₂O (p-toluene sulfonic acid) (6 gm) was added to this mixture followed by the drop-wise addition of bromine solution (64 ml). The reaction was maintained for 2 h at −20 to −25° C. To this mixture, methanol was added followed by drop wise addition of 40% aqueous DMA (450 g) solution. The reaction mass was washed with ethyl acetate (200 ml) solution to obtain 3,7-bis-(dimethylamino)-phenothiazin-5-ium bromide (IV) as crude.

Example-1(B) Preparation of 3,7-bis-(dimethylamino)-phenothiazin-5-ium chloride (I)

3,7-bis-(dimethylamino)-phenothiazin-5-ium bromide (137 g) which is obtained as above is taken into separate round bottom flask under nitrogen gas atmosphere. To this mixture, methanol (520 ml) was added. The reaction was maintained at 50-55° C. with constant stirring for 1 h. The product thus obtained was filtered and washed with methanol and dried. To this mass, a mixture of methanol and 0.5M HCl solution was added. The reaction was heated at 50-55° C. for 1 hour with constant stirring. The reaction was allowed to cool followed by filtration and washing with methanol to give the product.

Example-2 (A)

Phenothiazine (II) (7.5 kg) is charged into round bottom flask under nitrogen gas atmosphere followed by addition of ethyl acetate at room temperature. To this mixture aluminium chloride (22.5 gm) was added. The temperature was brought to −25° C. followed by the drop wise addition of bromine solution (15 kg). The reaction was maintained for 2 h at −20 to −25° C. To this mixture, methanol was added followed by the drop wise addition of 40% aqueous DMA solution. The reaction mass was washed with ethyl acetate (200 ml) solution to obtain 3,7-bis-(dimethylamino)-phenothiazin-5-ium bromide (IV) as crude.

Example-2(B) Preparation of 3,7-bis-(dimethylamino)-phenothiazin-5-ium chloride (I)

3,7-bis-(dimethylamino)-phenothiazin-5-ium bromide (6.35 g) which is obtained as above is taken into separate round bottom flask under nitrogen gas atmosphere. To this mixture, methanol (3.81) was added. The reaction was maintained at 50-55° C. with constant stirring for 1 h. The product thus obtained was filtered and washed with methanol and dried. To this mass a mixture of methanol and 0.5M HCl solution was added. The reaction was heated at 50-55° C. for 1 hour with constant stirring. The reaction was allowed to cool followed by filtration and washing with methanol to give the product.

Example-3 (A) Purification of Methylene blue

Methylene blue (75 g) as obtained by the above method is charged into round bottom flask under nitrogen gas atmosphere followed by addition of methanol (137 ml) at room temperature. To this mixture 0.5M HCl solution (548 ml) was added. The reaction was heated at 50-55° C. with constant stirring. To this mixture silicycle triamine (2.0 gm) was added. The reaction was maintained at 55-60° C. with constant stirring for 1 h. The product thus obtained was filtered and washed with methanol and dried to give the pure product (I).

Example-3 (B)

Methylene blue (75 g) as obtained by the above method is charged into round bottom flask under nitrogen gas atmosphere followed by addition of 0.2M HCl solution (1100 ml) at room temperature. The reaction was heated at 50-55° C. with constant stirring. To this mixture Quadrasil MP (2.0 g) was added. The reaction was maintained at 55-60° C. with constant stirring for 1 h. The product thus obtained was filtered and washed with methanol and dried to give the pure product (I).

Example-3 (C)

Methylene blue (50 g) as obtained by the above method is charged into round bottom flask under nitrogen gas atmosphere followed by addition of 0.2M HCl solution (733 ml) at room temperature. The reaction was heated at 50-55C with constant stirring. To this mixture Aliquat 336 (0.25 g) was added. The reaction was maintained at 55-60° C. with constant stirring for 1 h. The product thus obtained was filtered and washed with methanol and dried to give the pure product (I).

TABLE 1

Results of different batches of Example-1 and 2 are described here.

| Ingredient/Parameters | Example No. (1) | Example No. (2) |
|---|---|---|
| Reactant | Phenothiazine | Phenothiazine |
| Catalyst | Boron trifluoride acetic acid complex | Aluminium chloride |
| Bromination | Bromine | Bromine |
| Dimethylamine | 35-40% (Aq DMA) | 35-40% (Aq DMA) |
| % Purity | 99.40% | 99.50% |
| % Impurities-A | 0.40% | 0.26% |

TABLE 2

Results of different batches of Example-3 (A, B & C) are described here.

| Ingredient | | Example No. (A) | (B) | (C) |
|---|---|---|---|---|
| Metal scavengers | | Silicycle triamine | Quadrasil MP | Aliquat 336 |
| | % Purity | 99.6 | 99.6 | 99.6 |
| Impurities (%) | Impurities A | 0.31 | 0.32 | 0.30 |
| | Unspecified impurities | 0.04 | 0.05 | 0.05 |
| | Total impurities other than A | 0.09 | 0.13 | 0.10 |

*HPLC method and specifications according to USP and European Pharmacopoeia.

TABLE 3

Metal contents (ppm) in results of different batches of Example-3 (A, B & C) are described below:

| Sr. No. | Metal Content (ppm) | | | | | | | | | | | | |
|---|---|---|---|---|---|---|---|---|---|---|---|---|---|
| | As | Al | Cd | Cr | Cu | Fe | Hg | Mo | Ni | Pb | Zn | Mn | Sn |
| Ex. 3 (A) | 0.01 | 7.4 | 0.02 | 0.67 | 0.49 | 8.2 | 0.08 | 1.89 | 0.41 | 0.19 | 2.4 | — | — |
| Ex. 3 (B) | 0.01 | 8.2 | — | 0.08 | 1.21 | 11.7 | — | 3.63 | 0.15 | 0.06 | 1.8 | 0.1 | — |
| Ex. 3 (C) | 0 | 7.8 | 0 | 0 | 0.04 | 7.9 | 0 | 0.12 | 0 | 0 | 1.3 | 0.1 | 0 |

The illustration of the present invention is performed by HPLC, in which 98 to 99.7 percentage of purity is obtained by the methylene blue. The metal content is detected through ICP-MS (inductively coupled plasma-mass-spectrometry) device.

The invention claimed is:

1. A process for preparation of 3,7-bis (dimethylamino)-phenothiazin-5-ium chloride of formula (I):

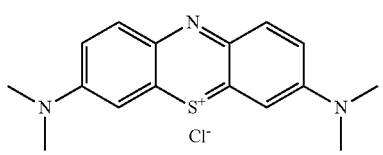

Formula I wherein said process comprises the steps of:

(a) preparing 3,7-dibromophenothiazin-5-ium bromide wet crude of formula (III)

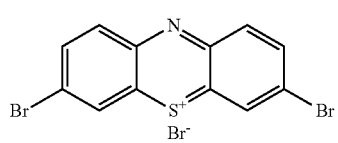

Formula III by reacting phenothiazine of formula (II)

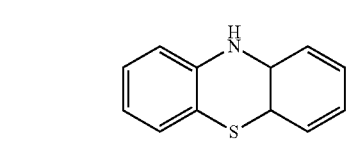

Formula II along with a promoter, catalyst and brominating agent in the presence of an organic solvent;

(b) preparing 3,7-bis-(dimethylamino)-phenothiazin-5-ium bromide of formula (IV)

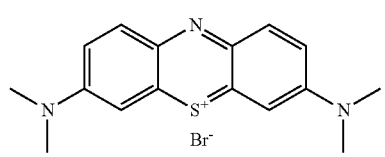

Formula IV from the 3,7-dibromophenothiazin-5-ium bromide of formula (III)

(c) preparing of 3,7-bis (dimethylamino)-phenothiazin-5-ium chloride of formula (I) from the 3,7-bis-(dimethylamino)-phenothiazin-5-ium bromide of formula (IV); and (d) purifying and removing metal content from the 3,7-bis-(dimethylamino)-phenothiazin-5-ium chloride of formula (I), using a metal scavenger.

2. The process for preparation of 3,7-bis (dimethylamino)-phenothiazin-5-ium chloride of claim 1, wherein the catalysts are selected from metal catalyst and boron trifluoride acetic acid complex.

3. The process for preparation of 3,7-bis (dimethylamino)-phenothiazin-5-ium chloride of claim 1, wherein said promotor is p-toluene sulfonic acid (PTSA).

4. The process for preparation of 3,7-bis (dimethylamino)-phenothiazin-5-ium chloride of claim 1, using the reagent dimethylamine (DMA).

5. The process for preparation of 3,7-bis (dimethylamino)-phenothiazin-5-ium chloride of claim 1, wherein said brominating agents are selected from bromine and 1,3-dibromo-5,5-dimethylhydantoin.

6. The process for preparation of 3,7-bis (dimethylamino)-phenothiazin-5-ium chloride of claim 1, wherein said organic solvent is selected from ethyl acetate, methanol, acetic acid isopropyl alcohol, hydrochloride acid (HCl), chloroform, dichloromethane, methylacetate, butylacetate and mixtures thereof.

7. The process for preparation of 3,7-bis (dimethylamino)-phenothiazin-5-ium chloride of as claim 1, wherein said metal scavenger is selected from polymers resin materials, silica based micropores, AMPA-functionalized silica gel ≥99%, Bipyridine, polymer-bound, Cysteine-functionalized silica gel, 3-(diethylenetriamino) propyl-functionalized silica gel, DL-Dithiothreitol, polymer-bound, DMT-functionalized silica gel, DOTA-functionalized silica gel, Ethylenediaminetriacetic acid acetamide, polymer-bound, 3-(Ethylenediamino) propyl-functionalized silica gel, 2-Mercaptoethylamine, polymer-bound, 3-Mercaptopropyl-functionalized silica gel, mixtures of metal scavengers on silica gel, N propyldiethanolamine-functionalized silica gel, macroporous, 3-(1-Thioureido) propyl, Triamine tetraacetate, silica-supported, Triaminetetraacetate, sodium salt-functionalized silica gel, Triaminetetraacetic acid-functionalized silica gel, triamine tetracetate, sodium salt, silica-supported, N, N, N'-Trimethylethylenediamine, polymer-bound and wherein the metal scavenger is present in an amount of <1 ppm to 10 ppm, and more preferably <1 ppm to 3 ppm.

8. The process for preparation of 3,7-bis (dimethylamino)-phenothiazin-5-ium chloride of claim 1, wherein the percentage of organic impurities is in the range of 0.1 to 0.35 percentage.

9. The process for preparation of 3,7-bis (dimethylamino)-phenothiazin-5-ium chloride of claim 1, wherein the percentage purity is in the range of 99 to 99.5 percentage.

* * * * *